United States Patent [19]

Nakamura

[11] 4,259,717
[45] Mar. 31, 1981

[54] INFORMATION PROCESSOR

[75] Inventor: Norimitsu Nakamura, Oume, Japan

[73] Assignee: Tokyo Shibaura Denki Kabushiki Kaisha, Japan

[21] Appl. No.: 940,129

[22] Filed: Sep. 6, 1978

[30] Foreign Application Priority Data

Sep. 6, 1977 [JP] Japan .................. 52/107032

[51] Int. Cl.³ .............................................. G06F 9/46
[52] U.S. Cl. .................................................. 364/200
[58] Field of Search ... 364/200 MS File, 900 MS File

[56] References Cited

U.S. PATENT DOCUMENTS

| 3,833,888 | 9/1974 | Stafford et al. | 364/200 |
|---|---|---|---|
| 4,003,028 | 1/1977 | Bennett et al. | 364/200 |
| 4,020,472 | 4/1977 | Bennett et al. | 364/200 |
| 4,025,906 | 5/1977 | Riikonen | 364/200 |
| 4,050,097 | 9/1977 | Miu et al. | 364/200 |
| 4,080,652 | 3/1978 | Cronshaw et al. | 364/200 |
| 4,086,626 | 4/1978 | Chung | 364/200 |
| 4,086,627 | 4/1978 | Bennett et al. | 364/200 |

Primary Examiner—Joseph F. Ruggiero
Attorney, Agent, or Firm—Finnegan, Henderson, Farabow, Garrett & Dunner

[57] ABSTRACT

An information processor is comprised of a plurality of circuits each of which is controlled by firmware and connected to a common bus and has a contention circuit for the bus. An arithmetic control unit for controlling the execution of the firmware is provided with a timing control circuit. When the arithmetic control unit is going to issue a bus use request or has issued the request of when it is issuing an interrupt inhibit instruction or interrupts its operation, another unit connecting to the common bus seizes the bus and interrupts the arithmetic control unit. In such a case, the timing control circuit causes the execution timing of the arithmetic control unit to be in a wait state and accepts the interrupt.

20 Claims, 61 Drawing Figures

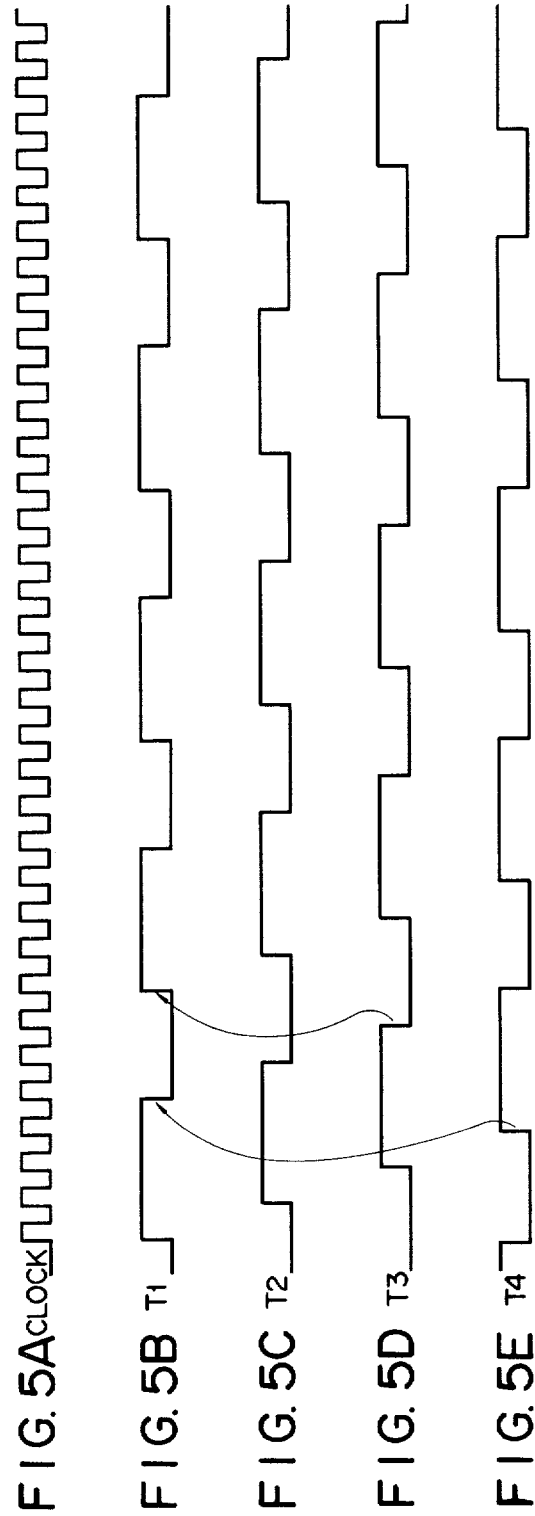

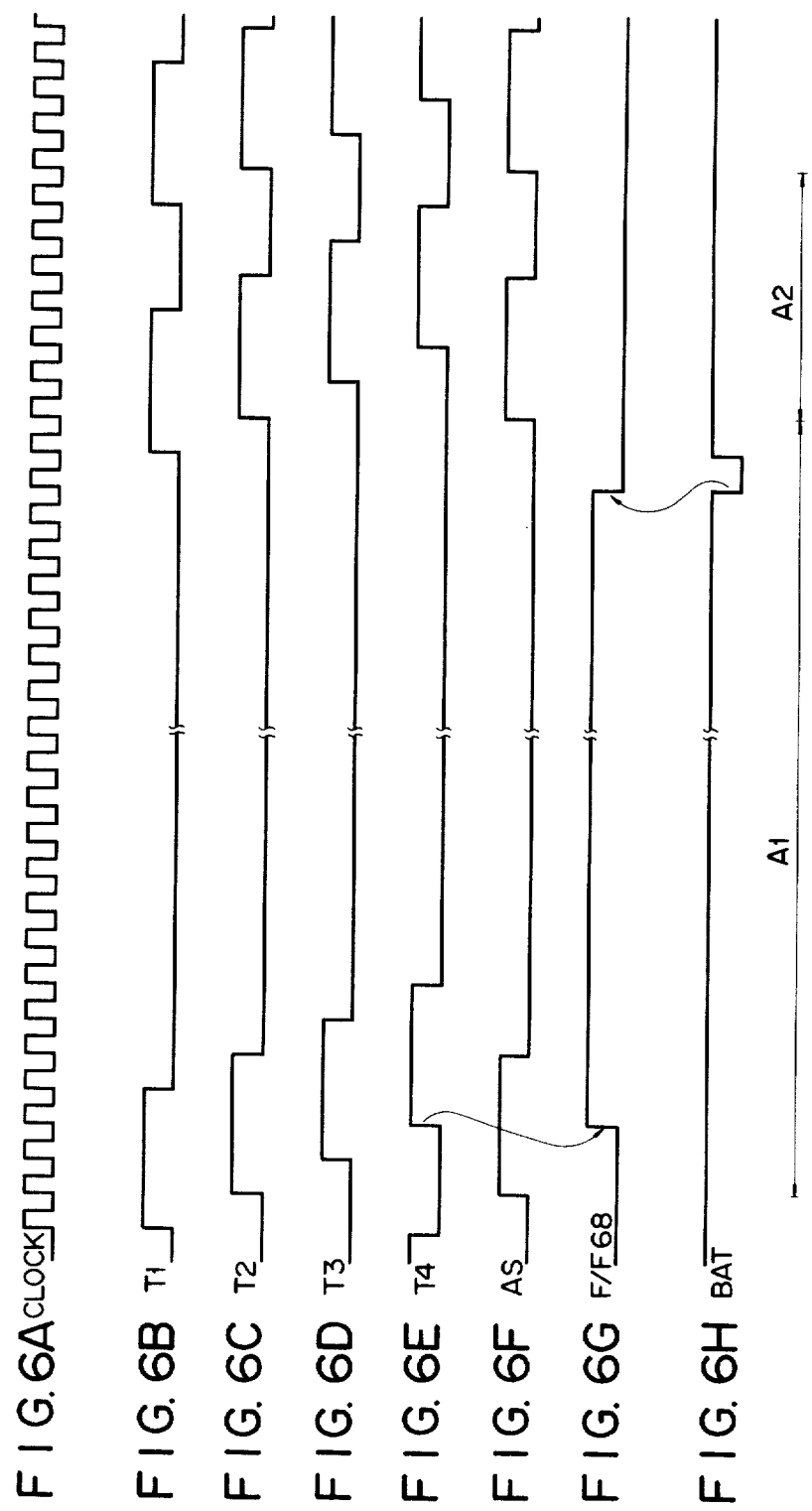

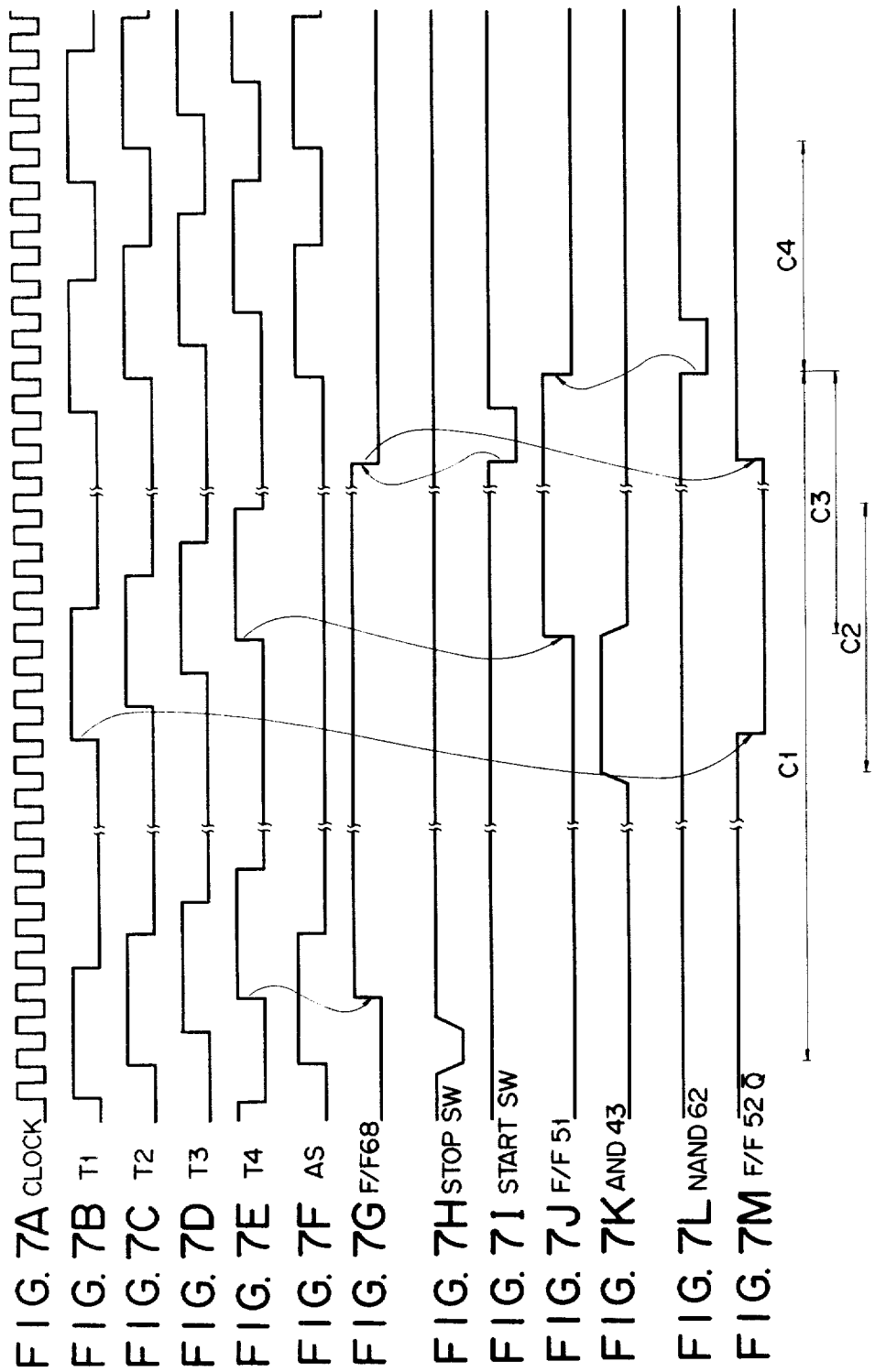

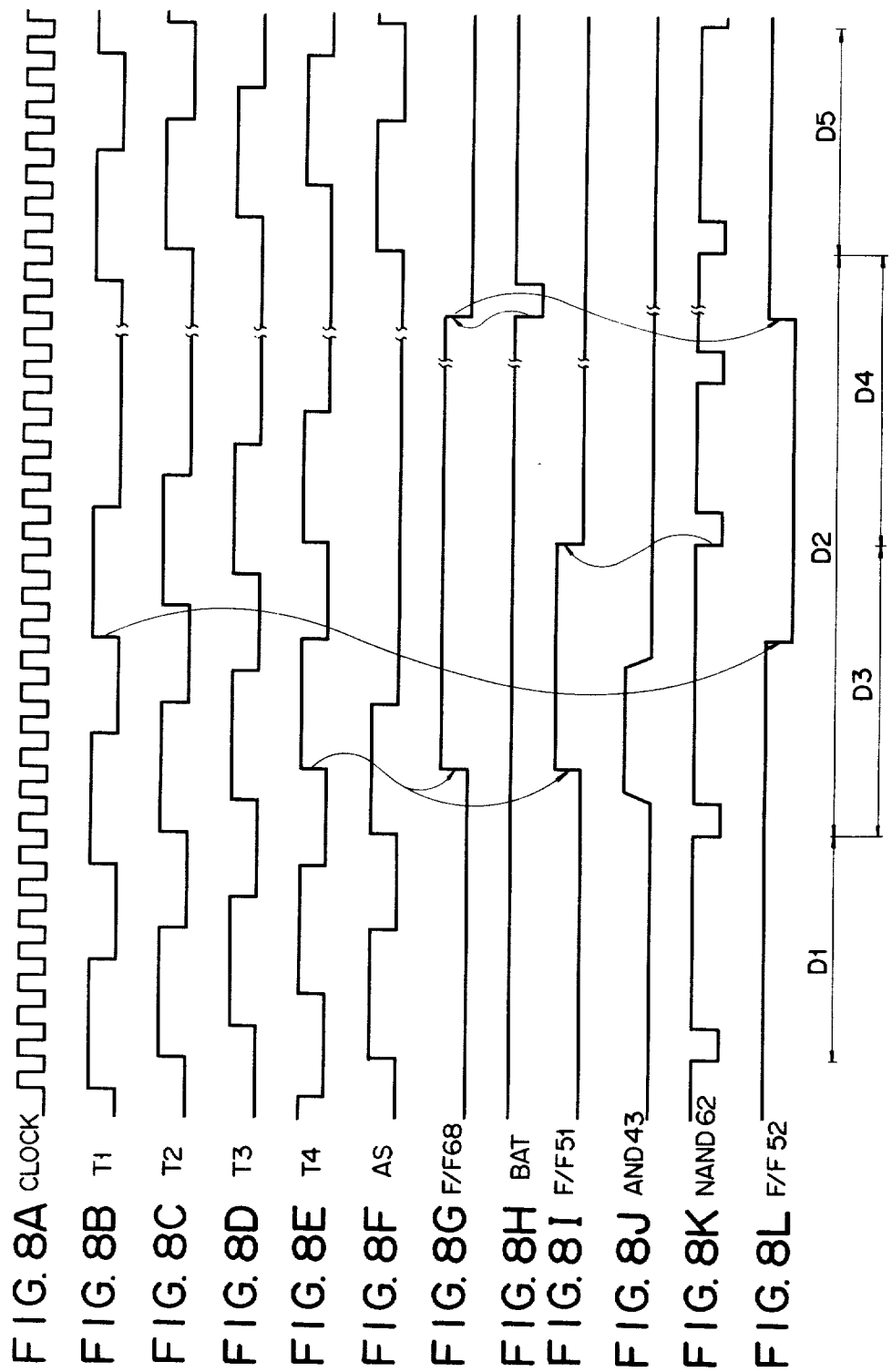

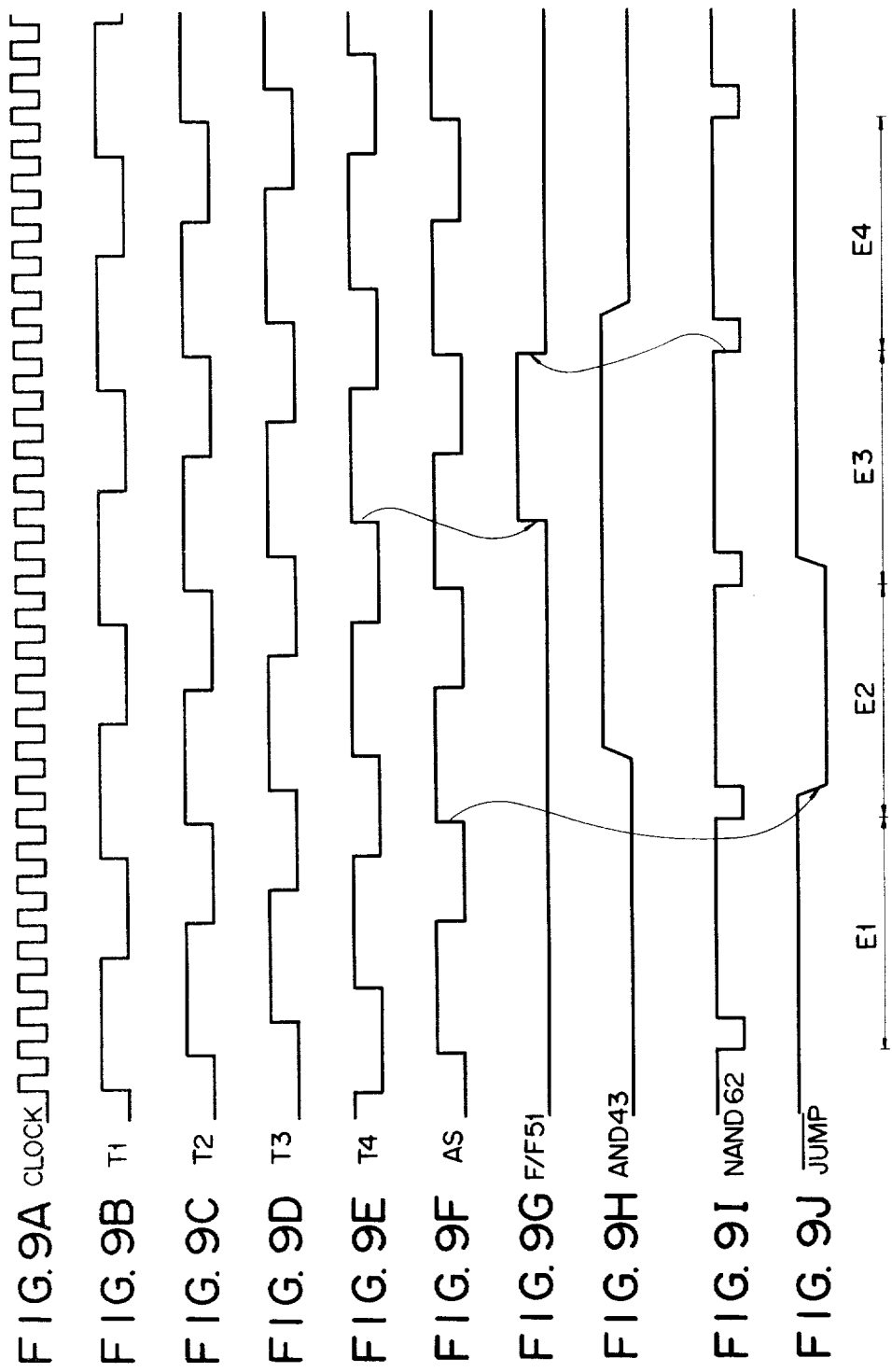

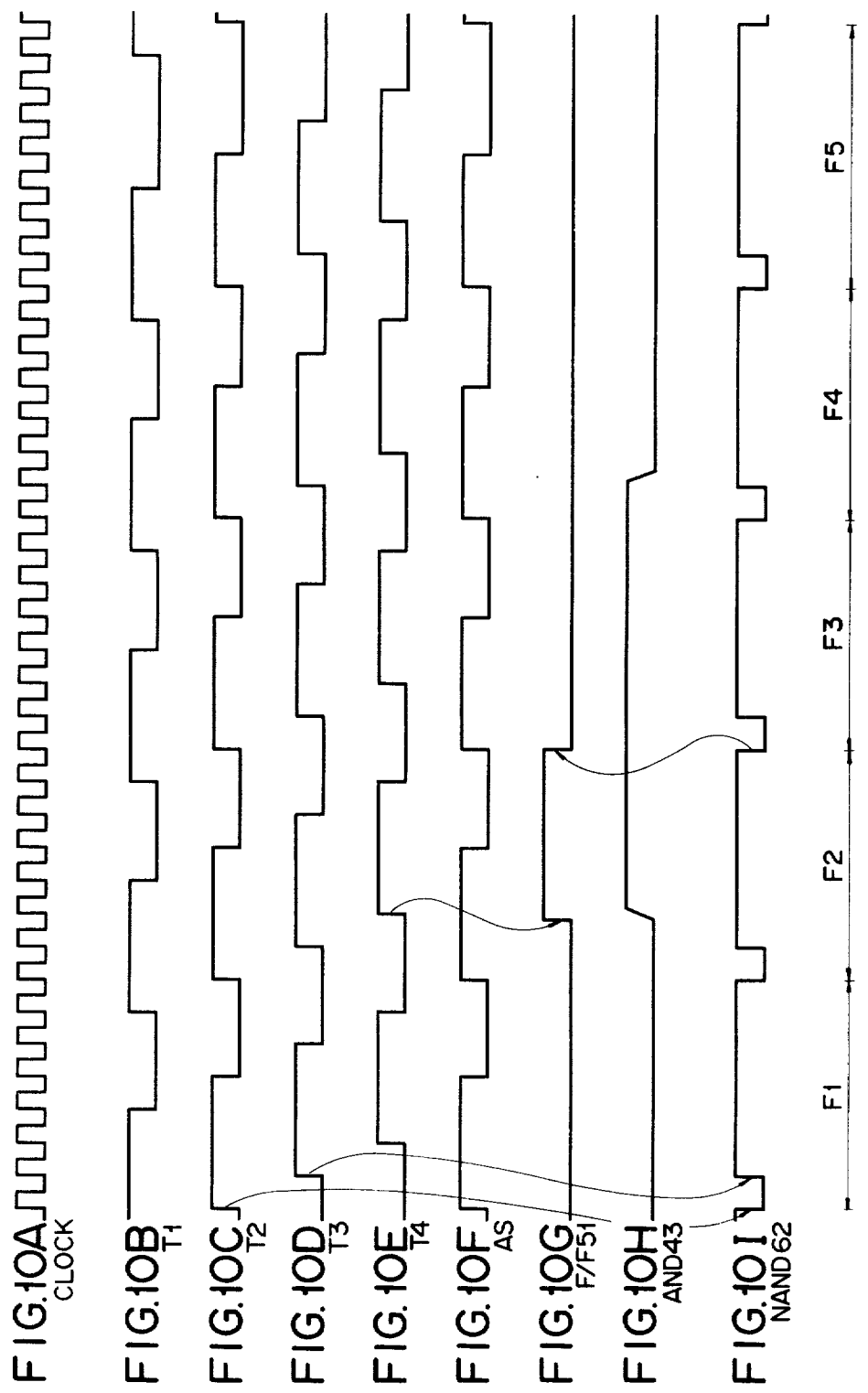

INFORMATION PROCESSOR

BACKGROUND OF THE INVENTION

The present invention relates to an information processor in which an arithmetic control unit (ACU), a main memory unit (MMU), and an input and output controller are subject to firmware control and, more particularly, to the above type information processor in which an interrupt from each of the units is acceptable even during the execution of instructions of the firmware.

With the recent development of large scale integration (LSI), it is a common practice that the arithmetic control part and the input/output control part in a microcomputer system are constructed by hardwired logic. The need of cost reduction and easy alternation of the system function has developed a computer system using soft logic called firmware now predominantly used in various types of information processors. The firmware, comprised of a number of microinstructions, is loaded in a read only memory (ROM) and microinstructions (several or several tens of steps) corresponding to a mnemonic written by a user are read out and executed. The firmware includes instructions for accessing a bus such as a COM instruction and an instruction for inhibiting an interrupt, e.g., a JUMP instruction.

Referring now to FIG. 1, there is shown an interconnection among the respective units forming an information processor. As shown, a main memory unit (MMU) 1 is connected through a memory bus (M-BUS) 2 to a central processing unit (CPU) 3. A plurality of input/output units (I/O(1) to I/O(n)) are connected to CPU 3, through an input/output bus 5. CPU 3 is provided with an input and output device controller (IOC) 6. With this constructed information processor, when receiving an instruction from CPU 3, a input/output unit 4 produces an interrupt request signal to CPU 3 to request a data transfer to and from MMU 1. In such a data transfer, the address of MMU 1 and the transfer block length of the data to be transferred, etc. are controlled by CPU 3.

When the data transfer is completed or an error takes place during the data transfer, the input/output unit 4 produces an interrrupt signal toward CPU 3 for terminating the data transfer. The data transfer in such a case is carried out in the following manner. The I/O unit 4 sends an interrupt request signal to the I/O bus 5 and CPU 3 receives the interrupt request signal and produces an interrupt acknowledge signal. The interrupt acknowledge signal passes through respective input/output units (I/O(1) to I/O(n)) to reach the I/O unit 4 which has produced the interrupt signal. This interrupt acknowledging method is called a daisy chain system. Upon receipt of the interrupt acknowledge signal, the I/O unit 4 issues the interrupt signal information necessary for the I/O bus 5 such as a channel number and a kind of interruption. When the kind of interrupt is a data transfer request, CPU 3 accesses the main memory 1 and performs a data transfer with the I/O unit 4.

FIG. 2 shows an interconnection of another information processor for which the invention is applied. In this system, an arithmetic control unit (ACU) 12, input/output controllers (IOC(1) to IOC(n)) 14 and a main memory unit (MMU) 13 are commonly connected to a common bus 11. CPU 3 in this case is provided with a plurality of IOCs which control various input and output devices (I/O devices). With such a construction, the respective units, i.e. ACU 12, IOC 14 and MMU 13, may be connected to the common bus 11. Each IOC 14 may be so designed as to supervise a plurality of IOCs or connect a plurality of ACUs 12 to the common bus 11. Thus constructed the processor can effect decentralized data processing and improve the throughput. The respective units 12 to 14, connected to the common bus 11, are each provided with a contention circuit for the bus 11. When the bus 11 is used, a bus busy signal, the address (channel number) of a called opposite unit, the address (channel number) of a calling unit, transfer data, control information and like are outputted to the bus 11. The called opposite unit, when receiving the information, transmits or receives information in accordance with the control information to and from the calling unit. When the ACU 12 executes the bus access instruction in the firmware and (1) is going to issue a request for using the bus 11, (2) has issued the request, (3) is currently executing an interrupt inhibition instruction, or (4) interrupts the execution of the firmware, if another unit on the bus seizes the bus 11 and makes an access to the ACU 12, the interrupt can not be accepted until the ACU 12 completes the execution of the firmware and use of the bus.

SUMMARY OF THE INVENTION

Accordingly, an object of the invention is to provide a firmware controlled information processor which can accept an interrupt while any instruction of the firmware except interrupt inhibit instruction is being executed and an information processor with an improved throughput in which, when the ACU 12 executes a bus access instruction in the firmware and is going to issue a request for using the bus 11 or has issued the request, it causes the instruction execution timing to be in a wait state and accepts the interrupt at a given timing. When the information processor is interrupted during the execution of the interrupt inhibit instruction by the ACU 12, the interrupt is accepted at the timing of the execution of the next firmware instruction after the interrupt inhibit execution is ended and, the ACU transfers its control from firmware execution to interrupt processing routine and process the interrupt processing operation.

To achieve the above object, there is provided an information processor having a plurality of devices being accessible to each other and under control of firmware, comprising a timing signal generating means for generating timing signals for executing the firmware instruction and a timing wait means for causing the timing generating means to be in a wait state.

Other objects and features of the invention will be appear from the following description taken in connection with the accompanying drawings, in which:

BRIEF DESCRIPTION OF THE DRAWINGS

FIGS. 5A-5E show a set of timing charts of the output signals from the timing generating circuit shown in FIG. 4;

FIGS. 6A-6H show a set of timing diagrams for illustrating a transition phase where the arithmetic control unit is forced to be in a wait state in accordance with a COM instruction in the firmware;

FIGS. 7A-7M a set of timing diagrams for illustrating a transition phase where an interrupt has occurred when a stop switch on the maintenance panel causes the arithmetic control unit to be in a wait state;

FIGS. 8A-8L show a set of timing diagrams for illustrating an interrupt from the bus during the execution of the COM instruction;

FIGS. 9A-9J show a set of timing diagrams for illustrating an interrupt operation during the execution of an interrupt inhibit instruction such as a JUMP instruction, and FIGS. 10A-10I show a set of timing diagrams for illustrating a transition phase where an interrupt occurs while an ordinal firmware instruction is being executed.

DETAILED DESCRIPTION OF THE PREFERRED EMBODIMENT

Figure 1:
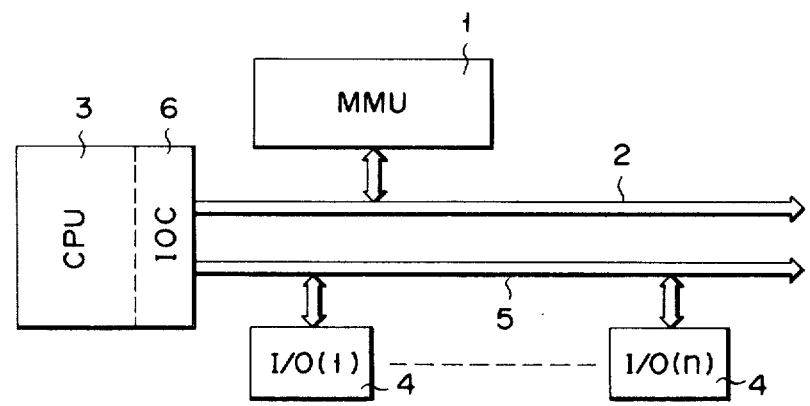
FIG. 1 shows a block diagram of a conventional information processor.
Figure 2:
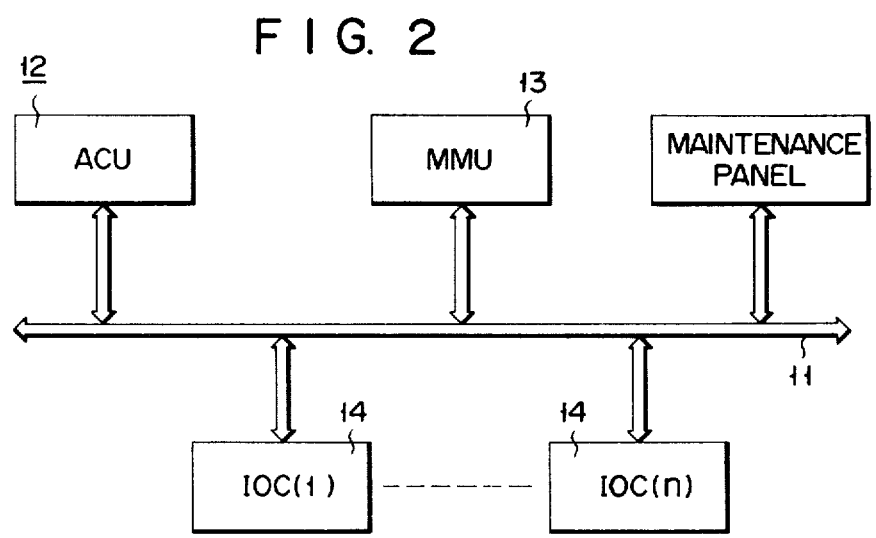
FIG. 2 shows a block diagram of an information processor for which the invention is applied.
Figure 3:
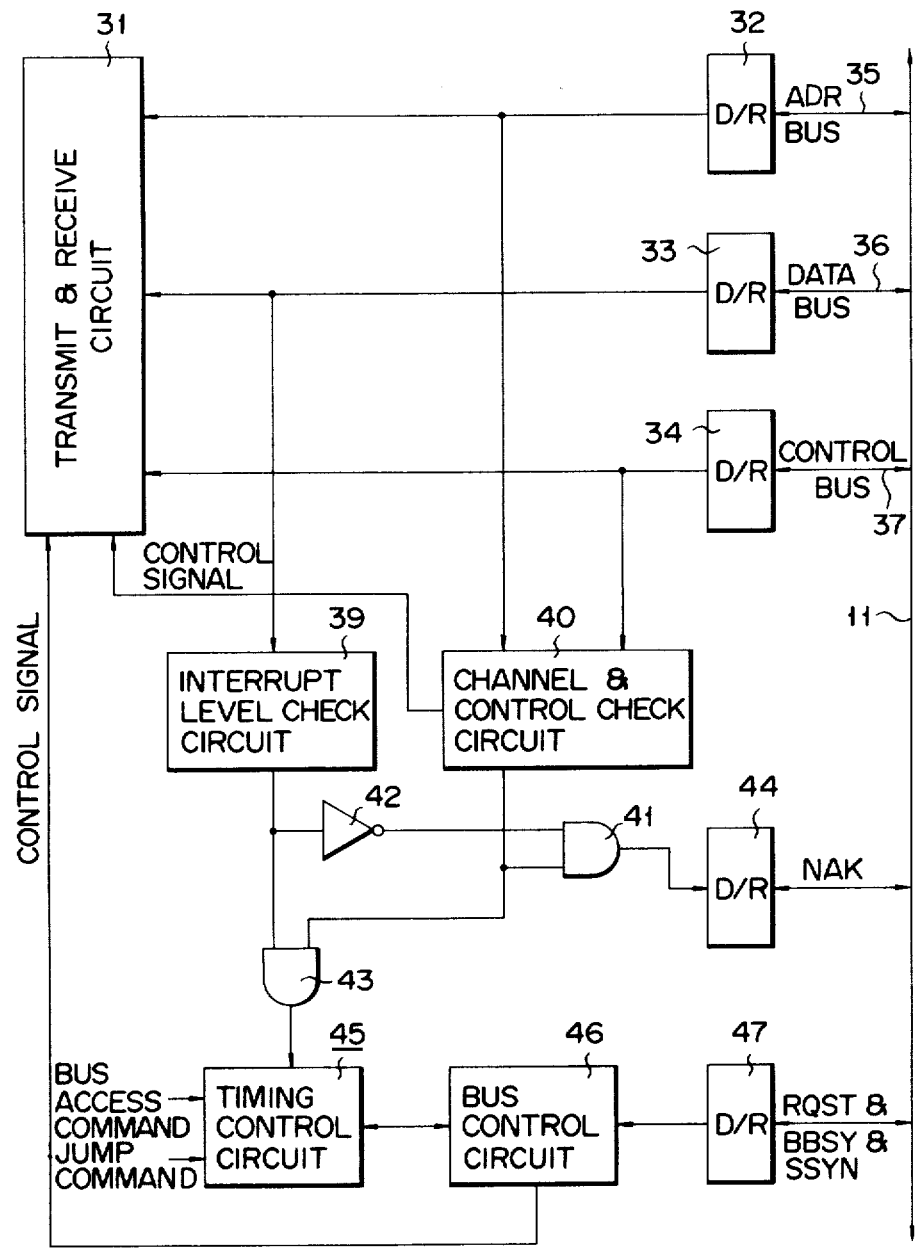
FIG. 3 shows a block diagram of a major part of an arithmetic control circuit.

Referring now to FIG. 3, there is shown in block diagram form a peripheral circuit relating to the information processor according to the invention.

In the figure, a transmitting and receiving circuit 31 is connected through driver/receiver circuits 32 to 34 to an address bus 35, a data bus 36, and a control bus 37, respectively, and these buses are connected to a common bus 11. The transmitting/receiving circuit 31, when a bus access instruction is executed, sends the information in accordance with a read/write instruction to the address bus 35 and the control bus 37, and the operation of the data bus is changed to a receiving mode or a transmitting mode in accordance with the read instruction or the write instruction. The above description is applied to a case where data is transferred from a master to a slave. Inversely, when an interrupt from the slave to the master takes place, and its interrupt is accepted, the master changes the modes of the address bus and the data bus to the receiving mode of transfers data to the data bus 36, by using control data on the control bus 37. An interrupt level check circuit 39 is connected to the data bus 36 through the driver/receiver 33. The interrupt level check circuit 39 monitors the data bus 36 and checks an inputted interrupt level. A channel and control check circuit 40 is connected through the driver/receiver circuits 32 and 34 to the address bus 35 and the control bus 37. The chanel/control circuit 40 monitors the address bus 35 and the control bus 37 and checks as to whether the unit to which the circuit 40 belongs is accessed or not. One of the output terminals of the channel and control check circuit 40 is connected to the control terminal of the transmitting/receiving circuit and the other output terminal is connected to one of the input terminals of a first AND circuit 41 and to one of the input terminals of a second AND circuit 43. The output terminal of the interrupt level check circuit 39 is connected to the other input terminal of the AND circuit 41 through an inverter 42 and to the other input terminal of the second AND circuit 43. The output terminal of the AND circuit 41 is connected to the common bus 11 through a driver/receiver circuit 44. The output terminal of the second AND circuit 43 is connected to the control terminal of a timing control circuit 45. The timing control circuit 45, when receiving a bus access instruction, instructs a bus control circuit 46 to seize the bus and it receives a bus access termination signal from the bus control circuit 46 and terminates the bus access instruction.

When an interrupt request signal is inputted, the timing control circuit controls its timing and further the timings of the bus access instruction and the interrupt inhibit instruction. When the channel and control check circuit 40 and the interrupt level check circuit 39 per se are accessed, and have an interrupt level acceptable for interrupt, they send an interrupt signal to the timing control circuit 45. On the other hand, if each has an interrupt level unacceptable for interrupting, they will each send a negative acknowledge signal (NAK) back to the common bus 11. The timing control circuit 45 is connected to the bus control circuit 46 and the bus control circuit 46 is connected to the common bus 11 through the driver/receiver 47. The other output terminal of the bus control circuit 46 is connected to the other control terminal of the transmitting and receiving circuit 31.

Figure 4:
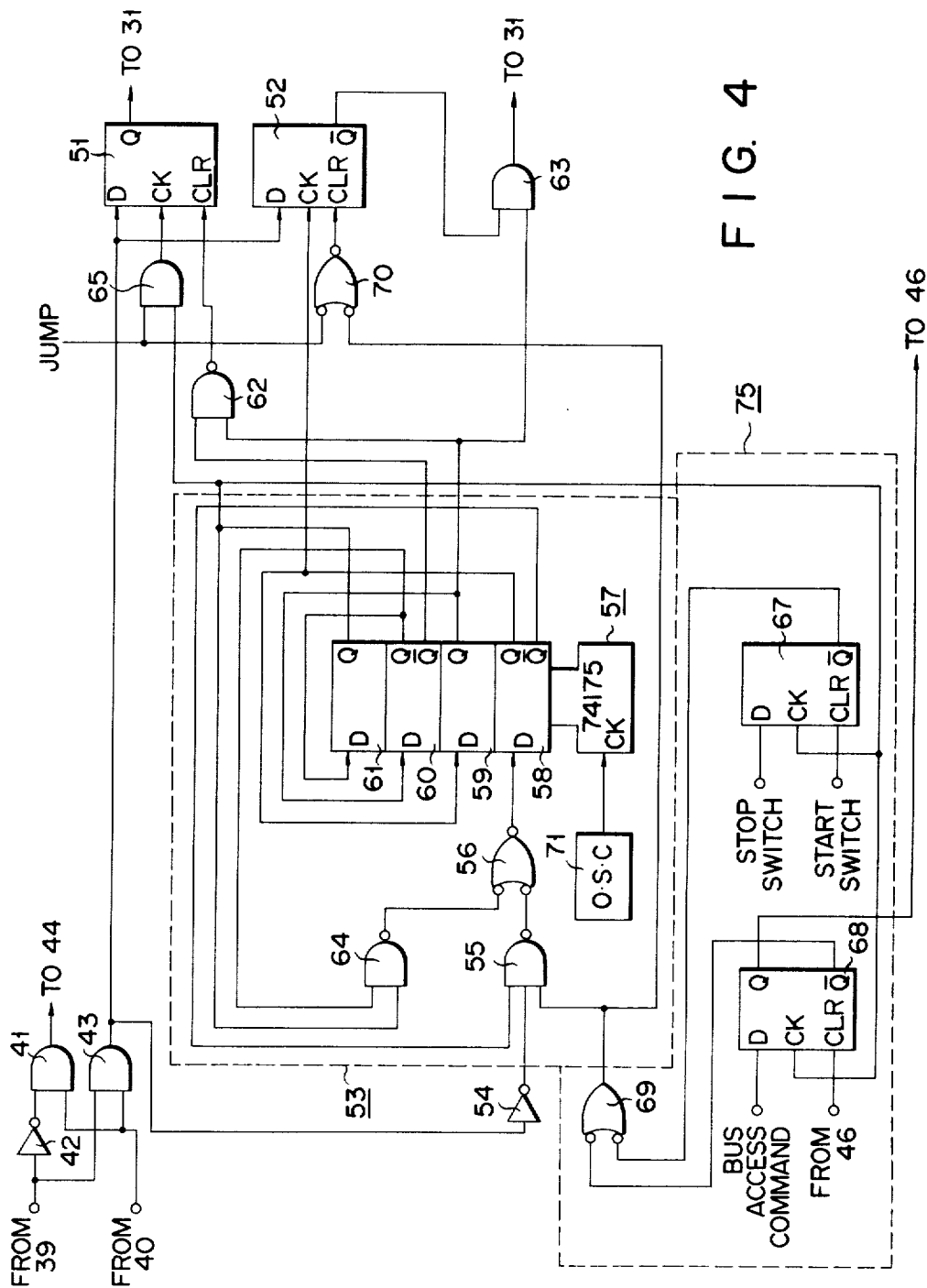
FIG. 4 shows a circuit diagram of a timing control circuit.

Turning now to FIG. 4, there is shown a circuit diagram of the timing control circuit 45. In the figure, the output terminal of the second AND circuit 43 is connected to a D input terminal of an interrupt acceptance flip-flop 51 as an interrupt granting circuit and the Q-output terminal of the flip-flop 51 is connected to the transmit and receive circuit 31. The interrupt acceptance flip-flop 51 is set by the interrupt request signal which is judged by the interrupt level check circuit 39 to have higher interrupt level than the level that ACU is currently masking, and the interrupt is accepted. The output terminal of the second AND circuit 43 is also connected to the D input terminal of an instruction execution inhibit flip-flop 52 as an instruction execution inhibit circuit and further to the timing generation circuit 53. The flip-flop 52 is used to force temporarily the execution of the bus access instruction to be in a wait state when the interrupt is accepted by the flip-flop 51.

The output terminal of the second AND circuit 43 is connected to the input terminal of the second inverter 54. The output terminal of the second inverter 54 is connected to the first input terminal of the first NAND circuit 55. The output terminal of the first NAND circuit 55 is connected to one of the input terminals of a NOR circuit 56. The output terminal of the first NOR circuit 56 is connected to the first input terminal of a shift circuit 57. The shift circuit 57 is comprised of four D-type flip-flops 58 to 61. For example, an integrated circuit commercially identified by SN74175 and made by Texas Instruments Co. is suitable for the flip-flops.

The Q output terminal of the first flip-flop 58 in the shift circuit 57 is connected to the D input terminal of the second flip-flop 59 and the Q output terminal of the first flip-flop 58 is connected to the second input terminal of the first NAND circuit 55. The Q output terminal of the second flip-flop 59 is connected to the D input terminal of the third flip-flop 60 and to the input terminal of the second NAND circuit 62 and further to one of the input terminals of the third AND circuit 63. The $\overline{Q}$ output terminal of the third flip-flop 60 is connected to the D input terminal of the fourth flip-flop 61 and to one of the input terminals of the third NAND circuit 64. The $\overline{Q}$ output terminal of the third flip-flop 60 is connected to the other input terminal of the second NAND circuit 62. The Q output terminal of the fourth flip-flop 61 is connected to the other input terminal of the third NAND circuit 64 and one of the input terminals of the fourth AND circuit 65 and to the CLOCK input terminals of a maintenance panel flip-flop 67 and a COM flip-flop 68 both constituting a timing wait circuit 75. The Q̄ output terminal of the COM flip-flop 68 is connected to one of the input terminals of the second NOR circuit 69 of which the other input terminal is connected to the Q output terminal of the maintenance panel flip-flop 67. The output terminal of the second NOR circuit 69 is connected to the third input terminal of the first NAND circuit 55 and to one of the input terminals of the third NOR circuit 70. The other input terminal of the third NOR circuit 70 is connected to the other input terminal of the fourth AND circuit 65. The output terminal of the third NOR circuit 70 is connected to the CLR input terminal of an instruction execution inhibit circuit 52. The D input terminal of the circuit 52 is connected to the D input terminal of the interrupt acceptance flip-flop 51. The Q̄ output terminal of the flip-flop 52 is connected to the other input terminal of the third AND circuit 63 and the output terminal of the third AND circuit 63 is connected to the transmit and receive circuit 31. The CK and CLR input terminals of the interrupt acceptance flipflop 51 are connected the output terminal of the fourth AND circuit 65 and the output terminal of the second NAND circuit 62, respectively.

The explanation to follow explains the operation of the invention in terms of the timing charts.

FIGS. 5A to 5E show a basic timing chart for illustrating the operation of the data processor in FIG. 4. In the figures, FIG. 5A is a clock signal outputted from the oscillator 71. FIGS. 5B to 5E show timing signals T1 to T4 produced from the first to fourth flip-flops 58 and 61 in the shift circuit 57. The timing signal T1 of FIG. 5B is derived from the Q output terminal of the first flip-flop 58 in the shift circuit 57 and the high level signals of T1 are inputted to the D input terminal of the second flip-flop 59 and the second timing signal T2 of FIG. 5C is derived from the output terminal Q of the second flip-flop 59.

The second timing signal T2 is applied to the D input terminal of the third flip-flop 60 and the third timing signal T3 (shown in FIG. 5D) is produced from the Q output terminal of the third flip-flop 60. The timing signal T3 from the Q output terminal is applied to the D input terminal of the fourth flip-flop 61 which in turn produces the fourth timing signal T4.

The timing signal T3 from the Q output terminal of the third flip-flop 60 and the timing signal T4 from the Q output terminal of the fourth flip-flop 61 are applied to the third NAND circuit 64. The output signal of the NAND circuit 64 is supplied to NOR circuit 56 such that when the output of NAND circuit 64 becomes a low level signal NOR circuit 56 which produces a low level signal. This low level signal is applied to the D input terminal of the first flip-flop 58. As a result, the timing signal T1 falls off and then the outputs of the second to fourth flip-flops 59 to 61 and the timing signals T2 to T4 will also fall off.

A series of these timing signals form one machine cycle and the instructions of the firmware are executed through a repetition of the machine cycles.

Turning now to FIG. 6, there is shown a set of timing diagrams from which we can see the fact that when a bus access instruction is executed, the timing of the ACU 12 is in a "wait" state.

In the figure, FIG. 6A shows a waveform of a clock signal. FIGS. 6B to 6E are waveforms of timing signals T1 to T4. FIG. 6F is a waveform of an arithmetic control signal. FIG. 6G is a waveform of an output signal of a COM flip-flop or a maintenance panel flip-flop. FIG. 6H is a wave shape of a BAT signal. A bus access instruction of firmware is executed during a period A1 and a next ordinal instruction is executed during a period A2.

Depending on the basic clock signal, the timing signals T1 to T4 rise in order. At this time, the timing signal T4 is applied to the clock terminal of the COM flip-flop 68 and the clock terminal of the maintenance panel 67. When the bus access instruction is executed, a COM signal is inputted from the transmitting and receiving circuit 31 into the COM flip-flop 68. As a result, the Q̄ output of the COM flip-flop 68 is inverted and is then applied to one of the input terminals of the second NOR circuit 69 of which the other input terminal receives the Q̄ output of the maintenance panel flip-flop 67. The output signal of the second NOR circuit 69 is applied as a high level signal to the third input terminal of the first NAND circuit 55. A signal at a high level is applied to the input terminal of the first NAND circuit 55 through the inverter 54. To the other input terminal of the NAND circuit 55, Q̄ signal of the flip-flop 58 is applied. The first NAND circuit 55 produces an output signal at a low level when the Q̄ signal becomes high level.

The low level signal is applied to one of the input terminals of the first NOR circuit 56. The NOR circuit 56 produces a low level signal which in turn is applied to the D-input terminal of the flip-flop 58. The timing signals T1 to T4 fall off in order and the timing of ACU 12 is in a "wait" state. This state is held so long as the COM flip-flop 68 is set. (See FIG. 6G)

When the bus access is terminated, a bus access termination signal from the common bus 38 as shown in FIG. 6H is applied to the CLR input terminal of the COM flip-flop 68 thereby to reset the flip-flop 68.

In FIG. 7, there is shown a set of timing charts illustrating an interrupt operation when the timing of the ACU 12 becomes in a "wait" state by the depression of the stop switch on the maintenance panel.

First, the transition phase will be described as follows where a stop switch on the maintenance panel causes the arithmetic control unit to be in a wait state.

FIGS. 7A to 7E are a clock signal and timing signals T1 to T4. First, responsive to the basic clock signal, the timing signals T1 to T4 rise. As in the execution of the COM instruction, the timing signal T4 is applied to the clock terminal of the maintenance panel flip-flop 67. When the stop switch on the maintenance panel is depressed as shown in FIG. 7H, an output signal from the Q terminal of the flip-flop 67 for the maintenance panel rises as shown in FIG. 7G. The output signal is applied to the first flip-flop 58 of the shift circuit 57 through the second NOR circuit 69 and the first NAND circuit 55. As a result, the output signal of the first NOR circuit 56 is at low level and the low level signal is applied to the D input terminal of the flip-flop 58. Accordingly, the signals T1–T4 successively become at "LOW" level and the timing of the ACU 12 becomes in "wait" state, so that the execution of the next instruction in the firmware is interrupted.

With respect to the reset of the maintenance flip-flop 67, when the start switch in FIG. 5I is turned on, the output signal of the flip-flop 67 for the maintenance panel falls off, as shown in FIG. 5G. Accordingly, the timing signals T1 to T4 of the ACU 12 successively become at "HIGH" level. That is, the "wait" state of the timing of the ACU 12 is released and the succeeding firmware instructions are executed.

In one of the uses of such a maintenance panel, while holding "ON" state of the stop switch, one repeatedly presses the start switch so that the firmware instructions are executed one by one.

Next, the operation will be described as follows where an interrupt occurs when the of ACU is in a wait state.

FIG. 7 shows a set of timing diagram for illustrating an interrupt operation when a timing of ACU is in a "wait" state by the depression of a stop switch of the maintenance panel. In a period C1, the maintenance panel flip-flop is set by the depression of the stop switch of the maintenance panel and a timing of ACU become in a "wait" state.

When an interrupt signal at a high level is supplied to an inverter 54 from the AND gate 43 in a period C2, the output signal of the inverter 54 becomes at low level, the signal is supplied to the NAND gate 55 and the output signal of the NAND gate 55 becomes at high level.

The output signal of the NAND gate 55 is supplied to the timing circuit. The timing signals T1, T2, T3, T4 are output from the timing circuit.

As the high level signal is supplied through the OR gate 69 and the NOR gate 70 to the CLR input terminal of the instruction inhibit flip-flop 52 by the set of the maintenance panel flip-flop 68, the interrupt signal at a high level from the AND gate 43 is supplied to the D input terminal of the instruction execution inhibit flip-flop and to the CK terminal of the flip-flop, the timing signal T1 is set at a high level from the timing circuit. Thus, the instruction execution inhibit flip-flop 52 is set.

When the instruction execution inhibit flip-flop 52 is set, the Q̄ output supplies a low level signal to the AND gate 63, thus, the timing signal which is supplied to the other terminal of the AND gate 63 becomes "OFF" and the AND gate 63 does not output the arithmetic signal.

When, therefore, the instruction execution inhibit flip-flop 52 is set, the next firmware instruction will not be executed because the arithmetic signal is not supplied even if the timing circuit is operated.

The interrupt signal at a high level from the AND gate 43 is supplied to the D input terminal of the interrupt acceptance flip-flop 51. The CK terminal of the flip-flop 51 receives the timing signal T4 supplied through the AND gate 65. Thus, the interrupt acceptance flip-flop 51 is set when the timing signal becomes changes from a low level to high level.

In a period C3, therefore, the firmware instruction currently being executed is in a "wait" state, and the next fetched firmware instruction is stored in a stack while the first instruction of the interrupt processing routine is fetched.

The interrupt signal becomes at low level and the timing circuit becomes in a "wait" state.

In a period C4, the timing circuit becomes operative and the timing signals T2 and T̄3 are applied to the NAND circuit 62 and the interrupt acceptance flip-flop 51 is reset by the output of the NAND circuit 62 since the start switch of the maintenance panel is depressed in a period C3 thereby resetting the maintenance panel flip-flop 67.

Synchronizing and interrupt requests from each unit on the bus for bus access (bus-gaining) with timing circuit operation is carried out in the following manner.

An interrupt request signal for use of the bus, as provided from each device, is applied to the interrupt level check circuit 39 where the interrupt level is checked. As a result of the checking, when the interrupt level of the interrupt request signal now being produced is lower than that of the signal that ACU is currently masking, the interrupt request is not granted. In this case, ACU 12 returns a NAK signal to IOC 14 or MMU 13.

If, however, the interrupt is to be granted, the timing signal T4 shown in FIG. 8J causes the second AND circuit 43 to produce an interrupt request signal. At this time, the interrupt acceptance flip-flop 51 is set and its output signal rises as shown in FIG. 8I. Further, the bus access instruction is being executed so that the COM flip-flop 68 rises at the timing of T4 as shown in FIG. 8G. The interrupt request signal is applied to the D input terminal of the instruction execution inhibit flip-flop 52. The CK input terminal of the instruction execution inhibit flip-flop 52 receives the timing signal T1 of the first flip-flop 58. Then, the timing signal T1 rises as shown in FIG. 8L and thus a low level signal is applied to one of the input terminals of the third AND circuit 63. Accordingly, the output signal T2 of the second flip-flop 59 is applied to the other input terminal of the AND circuit 63, and the AND circuit 63 is disabled.

The output signal of the second NAND circuit 62 is applied to the CLR input terminal of the interrupt acceptance flip-flop 51 and the output signal of the flip-flop 51 falls as shown in FIG. 8I. The timing signals T1 to T4 successively fall off and become in a "wait" state. When the bus access terminates, the bus access termination signal rises as shown in FIG. 8H and the BAT signal is applied to the CLR input terminal of the COM flip-flop 68 to reset the flip-flop 68 such that the COM flip-flop output falls off as shown in FIG. 8G. The output signal of the flip-flop 52 rises at the trailing edge of the BAT signal, as shown in FIG. 8L. The instruction execution inhibit flip-flop 52 operates only when the COM flip-flop 68 is set or when the stop switch of the maintenance panel is depressed, that is to say, the maintanance panel flip-flop 67 is set.

The timing charts in FIGS. 9A-9J illustrate an interrupt from the bus during the execution of the interrupt inhibit instruction, i.e. JUMP instruction. An ordinal instruction of firmware is executed during a period E1 and a JUMP instruction is executed during a period E2. An instruction after the JUMP instruction is executed and a jump performed to an interrupt routine during a period E3. An instruction of the interrupt routine is executed during a period E4.

The output signal of the AND circuit 43 of the interrupt level check circuit 39, i.e. an interrupt request signal, should not be set in the interrupt acceptance flip-flop 51 during a JUMP instruction. The low level signal of the JUMP signal is applied to the AND circuit 65 to prevent the timing signal T4 from being applied to the CK input terminal of the interrupt acceptance flip-flop 51. Accordingly, the interrupt request signal is not set in the flip-flop 51. As shown in FIG. 9J, after the JUMP instruction is executed, the JUMP signal becomes a high level and said interrupt acceptance flip-flop 51 accepts the interrupt request signal from the AND circuit 43 at the leading edge of the timing signal T4. As a result, the interrupt acceptance flip-flop 51 rises as shown in FIG. 9G.

The Q output of flip-flop 60 and the Q output of flip-flop 59 are supplied to NAND gate circuit 62 and the output signal of the circuit 62 becomes at low level. The low level signal is applied to the CLR input terminal of the interrupt acceptance flip-flop 51 so that the output signal of the interrupt acceptance flip-flop 51 goes down as shown in FIG. 9G.

While the interrupt inhibit instruction is being executed, the stop switch of the maintenance panel is depressed so that the timing circuit 53 of ACU 12 becomes in "wait" state. Under this condition, when the interrupt request signal is produced, the timing circuit operates and the next firmware instruction is executed.

The instruction execution inhibit flip-flop 52 receives a JUMP signal as a reset (CLR) signal through the third NOR gate 70. Therefore, the execution of the firmware instruction is not interrupted by the flip-flop 52. Accordingly, in this case, the interrupt request signal is accepted in the course of the execution of the next instruction of the firmware. Thus, the interrupt can be accepted even when the timing of the ACU is stopped while the interrupt inhibit instruction is being executed by the maintenance panel.

FIGS. 10A-10I shows a set of timing diagrams for illustrating a transition phase where an interrupt occurs during the execution of an ordinal firmware instruction. The ordinal firmware instruction is the one where a JUMP instruction and a bus access instruction are not involved. The ordinal firmware instruction is executed during a period F1 by an arithmetic signal. The next firmware instruction to be executed is fetched at the same time and the firmware instruction that has already been fetched in a preceding cycle is executed.

When an interrupt signal is supplied by AND gate 43, the signal is supplied to the D-input terminal of the interrupt acceptance flip-flop 51 and the CK input terminal of the flip-flop 51 receives the timing signal T4 from the AND gate 65. The interrupt acceptance flip-flop 51 is set as the timing signal T4 changes from at low level to at high level.

Though the interrupt signal is also supplied to the D-input terminal of the instruction execution inhibit flip-flop 52, the flip-flop 52 is not set since COM flip-flop 68 or maintenance panel flip-flop 67 supplies a low level signal to the CLR input terminal of the instruction execution inhibit flip-flop 52 through the OR gate 69 and NOR gate 70 when an instruction currently being executed is not a bus access instruction or the stop switch of the maintenance panel is not depressed. Thus, the arithmetic signal is not affected by the interrupt signal. The interrupt acceptance flip-flop 51 is set in a period F3, a firmware instruction that has already been fetched in a preceding cycle is executed, a firmware instruction to be executed next is stored into a stack, and the first instruction of the interrupt processing routine is fetched.

The CLR input terminal of the interrupt acceptance flip-flop 51 receives the low level signal from the NAND gate 62 and the flip-flop 51 is reset.

In a period F4, the firmware instruction of the interrupt processing routine is executed by the arithmetic signal.

After the interrupt processing is finished by executing the interrupt routine, the firmware instruction stored in the stack is begun to be executed by the execution of a return instruction.

At the time that, through the execution of the bus access instruction of the firmware by the ACU 12, the ACU 12 is going to issue a request for use of the bus or has issued the same, if an interrupt request for using the bus is given by another unit on the bus 11, the data processor thus constructed according to the invention causes the timing signal for executing a bus access instruction to be set to the firmware in a floating or wait state and interrupts the execution of the instruction to accept the interrupt. When the ACU 12 executes an interrupt inhibit instruction, the data processor holds the interrupt until the interrupt inhibit instruction terminates at which time the processor renders the timing "wait state" and accepts the interrupt. Therefore, the data processor according to the invention improves its throughput and is effective when it is used for decentralized data processing.

The data processor mentioned above is so designed as to permit the stop switch on the maintenance panel also to render the timing of the ACU 12 "wait" state when the firmware is executed. This feature is very useful for debugging of the firmware and the like.

The invention is not limited to the embodiment mentioned above and many changes and modifications are possible within the scope of the invention.

What is claimed is:

1. A microprogram controlled information processor having at least two units which compete for possession of a common bus by generating interrupt requests, at least one of said units comprising:
    timing generating means for generating outputs comprising timing signals for controlling the execution of the microprogram;
    means for selectively generating an inhibit signal for inhibiting said outputs of said timing generating means when said at least one unit has exclusive possession of the bus;
    first means for receiving an interrupt request generated by the other of said units while the outputs of said timing generating means are inhibited; and
    second means for receiving an interrupt request generated by the other of said units while the outputs of said timing generating means are not inhibited.

2. An information processor according to claim 1 further including a maintenance panel having a stop switch and a start switch, and wherein each of said at least two units generate bus access instructions for execution by said information processor and bus access termination signals to release possession of said bus.

3. An information processor according to claim 2 wherein said inhibiting means comprises:
    a first flip-flop being set by the execution of a said bus access instruction to inhibit the operation of said timing generating means, said first flip-flop being reset by a bus access termination signal to restart the operation of said timing generating means;
    a second flip-flop being set by the actuation of said stop switch on said maintenance panel to inhibit said timing generating means, said second flip-flop being reset by the actuation of said start switch on said maintenance panel to restart the operation of said timing generating means; and
    a logic circuit for logically summing the output signals for said first flip-flop and said second flip-flop.

4. An information processor according to claim 3 wherein said first flip-flop and said second flip-flop are each of a delay type.

5. An information processor according to claim 3 wherein said logic circuit is a two input OR circuit.

6. An information processor according to claim 1 wherein said timing generating means comprises:
    an oscillator for producing output signals;

first, second, third, and fourth timing flip-flops responsive to the output of said oscillator to produce first, second, third, and fourth timing signals, respectively, said first timing flip-flop including an input terminal;

a first logic circuit for logically multiplying said third timing signals and said fourth timing signals generated by said third flip-flop and said fourth flip-flop, respectively;

a second logic circuit for logically multiplying said first timing signals produced by said first flip-flop, said inhibit signal generated by said generating means, and said interrupt request signal; and a third logic circuit for logically summing the outputs of said first logic circuit and said second logic circuit to produce a third output signal and for applying said third output signal to said input terminal of said first timing flip-flop.

7. An information processor according to claim 6 wherein said first, second, third, and fourth timing flip-flops are each of a delay type.

8. An information processor according to claim 6 wherein said first logic circuit and said second logic circuit are each NAND circuits.

9. An information processor according to claim 6 wherein said third logic circuit is a NOR circuit.

10. A microprogram controlled information processor having at least two units which compete for possession of a common bus by generating interrupt requests with assigned priorities and by executing bus access instructions, at least one of said units comprising:

timing generating means for generating outputs comprising timing signals for controlling the execution of the microprogram;

means for generating an inhibit signal for selectively inhibiting said outputs of said timing generating means when said at least one unit has exclusive possession of the bus;

an interrupt check circuit for determining from the priority levels of said interrupt requests an interrupt request to be granted;

an interrupt acceptance circuit for selectively accepting said interrupt to be granted;

an instruction execution inhibit circuit for inhibiting the execution of said microprogram while a said bus access instruction is being executed; and means for activating said timing generating means to generate said timing signals and for controlling said interrupt acceptance circuit to accept a said interrupt request signal during the execution of a said bus access instruction.

11. An information processor according to claim 10 wherein each said at least two units generate bus access termination signals, wherein said processor includes a maintenance panel having a start switch and a stop switch, and wherein said inhibiting means comprises:

a first flip-flop being set by the execution of a said bus access instruction to inhibit the operation of said timing generating means to produce said timing signals, said first flip-flop being reset by a said bus access termination signal to restart the operation of said timing generating means;

a second flip-flop being set by the actuation of said stop switch on said maintenance panel to inhibit the production of said timing signals by said timing generating means, said second flip-flop being reset by the actuation of said start switch on said maintenance panel to restart the operation of said timing generating means; and a logic circuit for logically summing the output signals from said first flip-flop and said second flip-flop.

12. An information processor according to claim 10 wherein said timing generating means comprises:

an oscillator for producing output signals;

first, second, third, and fourth timing flip-flops responsive to said output signals from said oscillator to produce first, second, third, and fourth timing signals, respectively, said first timing flip-flop including an input terminal;

a first logic circuit for logically multiplying the output signals from said third timing flip-flop and said fourth timing flip-flop to produce a first logic output signal;

a second logic circuit for logically multiplying said timing signals generated by said first timing flip-flop, said inhibit signal and said interrupt request signal to produce a second logic output signal; and a third logic circuit for logically summing said first logic output signal and said second logic output signal to produce a third logic output signal and for applying an output signal to produce a third logic output signal and for applying said third logic or output signal terminal of said first timing flip-flop.

13. An information processor according to claim 10 wherein said interrupt check circuit comprises:

an inverter including an input terminal and an output terminal;

a first AND circuit having a first input terminal and a second input terminal, said first input terminal being connected to the output terminal of said inverter; and a second AND circuit having a first input terminal and a second input terminal, said first input terminal of said second AND circuit connected to the input terminal of said inverter, said second input terminal of said AND circuit connected to the second input terminal of said first AND circuit.

14. An information processor according to claim 10 wherein said interrupt acceptance circuit comprises: a D type flip-flop having an input terminal.

15. An information processor according to claim 10 wherein said instruction execution inhibit circuit comprises a second D type flip-flop having an input terminal, a clock terminal, and a clear terminal, said input terminal connected to the output of said interrupt acceptance circuit, said clock terminal connected to the output of said timing generator circuit, and said clear terminal being connected to the output of said generating means.

16. A microprogram controlled information processor including means for executing interrupt inhibit instructions and having at least two units which are connected to a common bus and which compete for control of said bus by issuing interrupt requests with given priority levels, at least one of said units comprising:

timing generating means for generating outputs comprising timing signals for controlling the execution of the microprogram;

means for generating an inhibit signal for selectively inhibiting said outputs of said timing and generating means when said at least one unit is controlling said bus;

an interrupt check circuit for determining from the priority levels of said interrupt requests an interrupt request to be granted;

an interrupt acceptance circuit for accepting said interrupt request to be granted when an interrupt inhibit instruction is not being executed and for delaying acceptance of an interrupt request to be granted until the timing of the next firmware instruction to be executed in said microprogram when a said interrupt inhibit instruction is being executed.

17. An information processor according to claim 16 wherein each of said units executes bus access instructions to gain possession of said bus and generate bus access termination signals to release said bus, wherein said processor includes a maintenance panel having a start switch and a stop switch, and wherein said generating means comprises:

a first flip-flop being set in response to the execution of a said bus access instruction to inhibit the generation of said timing signals by said timing generating means, said first flip-flop being reset by a said bus access termination signal to restart the operation of said timing generating means;

a second flip-flop being set in response to the actuation of said stop switch on said maintenance panel to inhibit the generation of said timing signals by said timing generating means, said second flip-flop being reset by the actuation of said start switch on said maintenance panel to restart the operation of said timing generating means; and a logic circuit for logically summing the output signals from said first flip-flop and said second flip-flop.

18. An information processor according to claim 16 wherein said timing generating means comprises:

an oscillator for producing output signals;

first, second, third, and fourth timing flip-flops for producing first, second, third, and fourth timing signals, respectively, in response to the output signals of said oscillator, said first timing flip-flop including an input terminal;

a first logic circuit for logically multiplying a said timing output signals produced by said third timing flip-flop and said fourth timing flip-flop to produce a first logic output signal;

a second logic circuit for logically multiplying the timing signals produced by said first timing flip-flop, said inhibit signal, and a said interrupt request signal to produce a second logic output signal; and a third logic circuit for logically summing said first logic output signal and said second logic output signal to produce a third logic output signal and for applying said third logic output signal to said input terminal of said first timing flip-flop.

19. An information processor according to claim 16 wherein said interrupt check circuit comprises:

an inverter having an input terminal and an output terminal;

a first AND circuit having a first input terminal, a second input terminal, and an output terminal, said first input terminal of said first AND circuit being connected to the output terminal of said inverter; and a second AND circuit having a first input terminal, a second input terminal, and an output terminal, said first input terminal of said second AND circuit being connected to said input terminal of said inverter, said second input terminal of said second AND circuit connected to said second input terminal of said first AND circuit.

20. An information processor according to claim 16 wherein said interrupt acceptance circuit comprises a D flip-flop having a D input terminal connected to the output terminal of said second AND circuit.

* * * * *